June 28, 1932.  W. H. ROBERTSON  1,864,761
CASH REGISTER
Filed July 28, 1924  4 Sheets-Sheet 1

Inventor
William H. Robertson
By Earl Beust
Henry E. Stauffer
His Attorneys

June 28, 1932.  W. H. ROBERTSON  1,864,761
CASH REGISTER
Filed July 28, 1924   4 Sheets-Sheet 2

Inventor
William H. Robertson
By Hearl Beust
Henry E Stauffer
His Attorneys

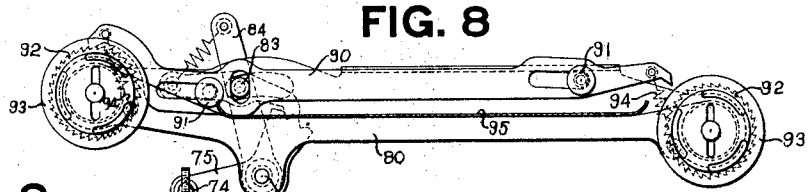

FIG. 14
FIG. 15
FIG. 16
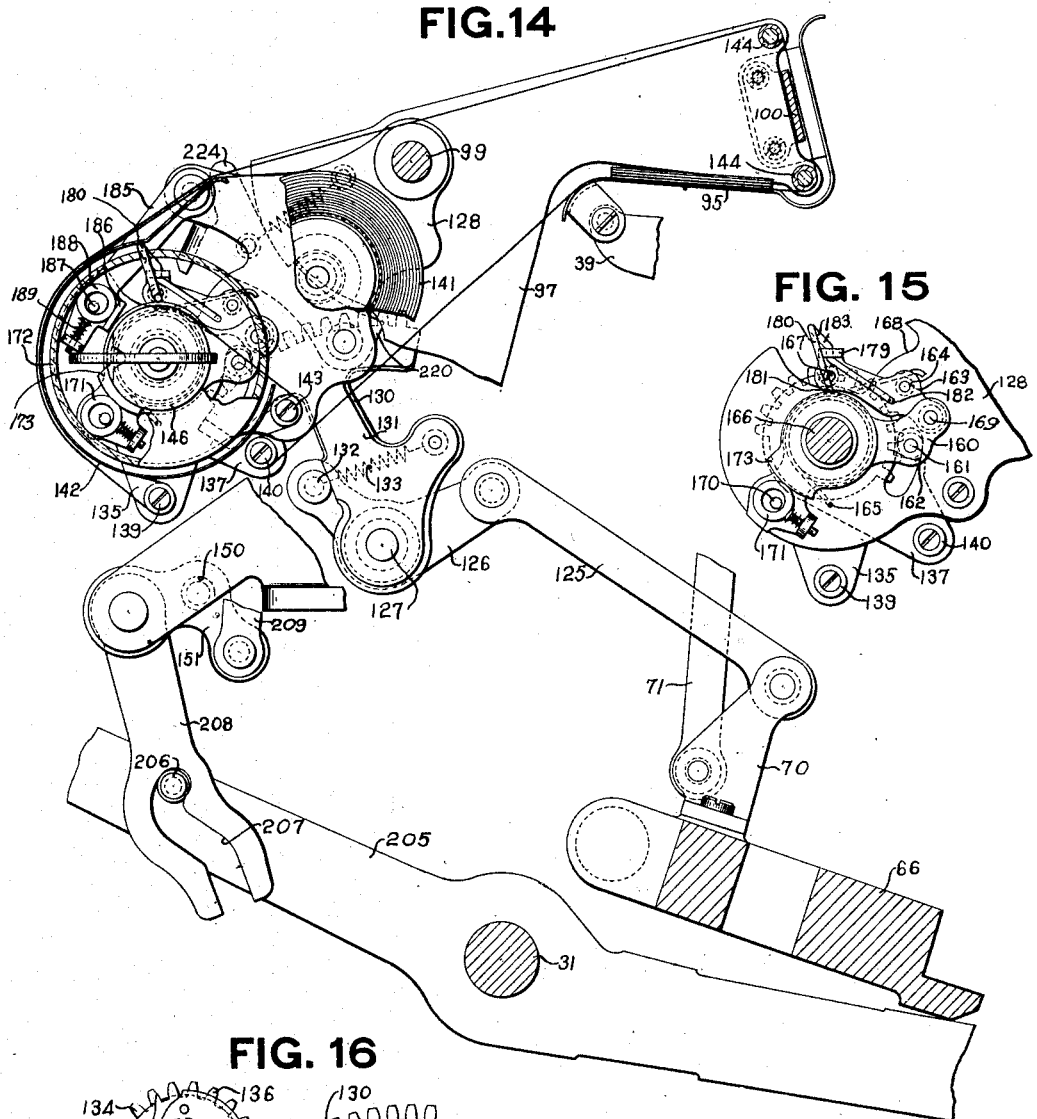
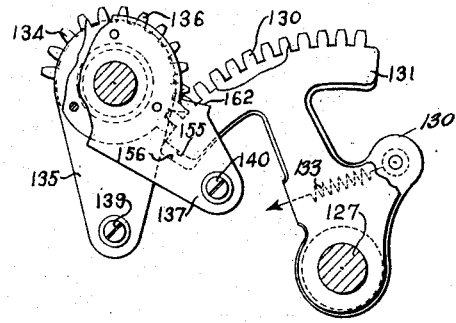
Inventor
William H. Robertson
By Carl Beust
Henry E. Stauffer
His Attorneys Patented June 28, 1932

1,864,761

UNITED STATES PATENT OFFICE

WILLIAM H. ROBERTSON, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed July 28, 1924. Serial No. 728,646.

This invention relates to improvements in cash registers, and has more particular relation to the type of cash register shown and described in Letters Patent of the United States issued to Thomas Carney, May 23, 1893, No. 497,860.

An object of the invention is to provide a total printer for a machine of this type, and instead of having the printer located on the right hand side of the machine, as is usual, as disclosed in Letters Patent of the United States, Nos. 1,555,534 and 1,593,203, granted to E. J. Von Pein on September 29, 1925 and July 20, 1926, respectively, on applications filed March 29, 1919, and April 4, 1921, respectively, it is located in the center of the machine.

Another object is to provide an improved paper-shifting mechanism, which permits a certain amount of slack in the paper, for easy operation of the machine.

Another object is to provide a paper feeding mechanism of an improved type, which is operated simultaneously with the operation of the paper shifting mechanism, and in which the printed portion of the check never passes the writing opening, but is always enclosed in the machine.

Another object is the provision of novel and compact paper feed and shifting mechanisms requiring a minimum amount of space in the machine.

A further object is to provide a total key which controls the printing of the total of the items, and also controls the length of shift of the paper, said key being of the regular press-down type used in machines of this character.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said drawings:

Fig. 8 is a detail front elevation of the ribbon feeding mechanism.

Fig. 9 is a detail view of a part of the ribbon feeding mechanism.

Fig. 10 is a detail end elevation of the ribbon feeding mechanism, looking toward the right side of the machine.

Fig. 11 is a detail view showing a section of the printed record.

Fig. 12 is a detail side elevation of the printing hammers and the control therefor, looking toward the left side of the machine.

Fig. 13 is a front elevation of a part of the mechanism shown in Fig. 12.

Fig. 14 is an enlarged detail view of the paper shifting and feeding mechanisms.

Fig. 15 is an enlarged detail view of a part of the paper shifting and feeding mechanisms.

Fig. 16 is an enlarged detail view of the means for rocking the paper shifting mechanism.

In general the machine includes one or more banks of keys of the usual well known type. The printing mechanism, instead of being at the side of the machine, as is usual, is located near the center of the machine and just above the totalizer. The totalizer in the present machine, is a printing-totalizer, instead of the usual reading type.

The machine is designed to permit autographic notations on the record strip, and the paper is therefore shifted from a writing opening to the printing line and back again. A glass or other transparent plate is provided above the writing opening so that a number of the last items printed are visible to the operator. The mechanism for spacing the various printed items is operated by the shifting mechanism, and is, therefore, operated simultaneously therewith.

There are two sets of printing wheels; one is geared directly to the totalizer actuators, for printing the items, and the other is located in the totalizer, and is in the position usually occupied by the reading wheels of the totalizer.

A special key is provided for printing totals. In machines of this type an operating crank is usually provided for printing totals. However, by the use of a regular press-down key, a much simpler total printing mechanism is possible.

Three special keys, i. e., "Charge", "Received on account" and "Paid out", are provided for setting a special character type wheel for designating the character of the transaction.

The machine, as shown, is not supplied with indicators. However, the usual well known indicators for this type of machine may be used if desired.

Figure 1:
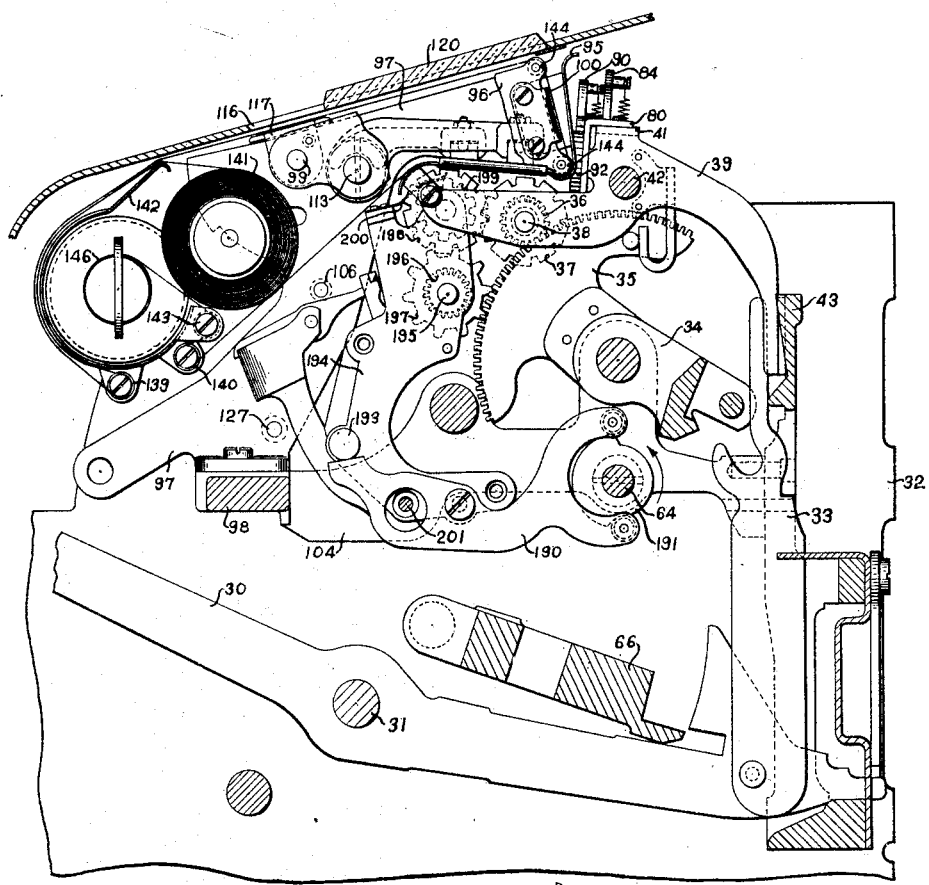
Fig. 1 is a cross section through the machine, taken to the right of the printing mechanism, looking toward the left side of the machine.

Described in detail, the mechanism is as follows: Keys 30 (Fig. 1), of the usual type, are pivotally mounted on a rod 31 carried by side frames 32, and have secured at the rear ends thereof the usual actuator controllers 33 provided with notches or recesses adapted to engage an actuator frame 34, and so located as to move the actuator frame various distances, according to the key depressed. The actuator frame has secured thereto a totalizer actuating segment meshing with a pinion 36 secured to the side of a type wheel 37. It can be seen, therefore, that when one of the keys 30 is depressed, the type wheels 37 will be positioned to correspond with the amount key depressed. There is one type wheel and one actuator frame 34 for each bank of keys. The present machine is provided with three banks or groups of keys as indicated by the amounts printed upon the record strip (Fig. 11). The type wheels are loosely mounted on a rod 38 journaled in frames 39 and 40 (Figs. 1 and 10). The frames 39 and 40 are connected by means of a bail 41 and are mounted on a rod 42 and a back frame 43, both of which are carried by the side frames 32.

Figure 5:
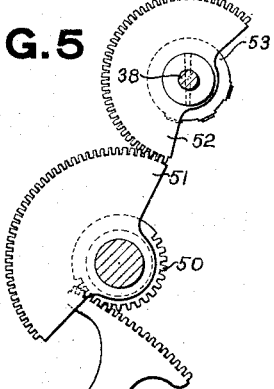
Fig. 5 is a detail view showing the mechanism for setting the character type wheel.
Figure 7:
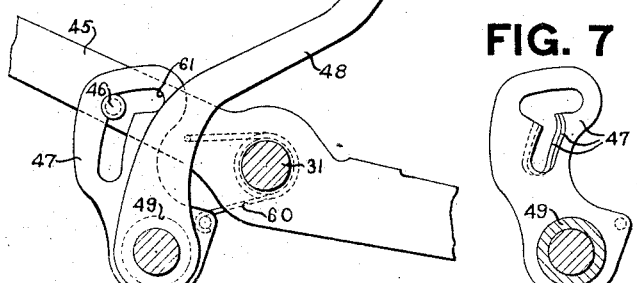
Fig. 7 is a detail view of the cams for setting the transaction type wheel.

A special type wheel 53 (Fig. 5), is provided to print the character designating the special transactions entered. The type wheel in the present machine has only three character-printing positions, namely; "Rec'd on Acct.", "Charge" and "Paid out". The printing position for a cash transaction is left blank, and therefore no character will be printed for a cash transaction. This type wheel is positioned by special keys 45 (one of which is shown in Fig. 5), each having secured thereto a pin 46 projecting into a slot in a cam 47. There are three special keys 45 in the present machine and a cam 47 (Fig. 7) for each of the keys. The cams 47 and a segment 48 are secured together by a sleeve 49. The segment 48 meshes with a segment 50 secured to a segment 51 which meshes with a segment 52 pinned to the previously mentioned rod 38. Also pinned to the rod 38 is a character type wheel 53 located just to the left of the dollars amount type wheel. The cams 47 are held in the positions shown in Fig. 5 by a spring 60. Each of the slots in the cams 47 is of a slightly different shape so that the type wheel 53 will be set according to the key depressed. Clearance cuts 61 in the cam slots are provided to permit the cams to rock forwardly over the studs 46 of the keys which are not depressed. This is necessary, because all of the cams are mounted on the sleeve 49 and when one key is depressed all of the cams 47 will move forwardly.

Figure 6:
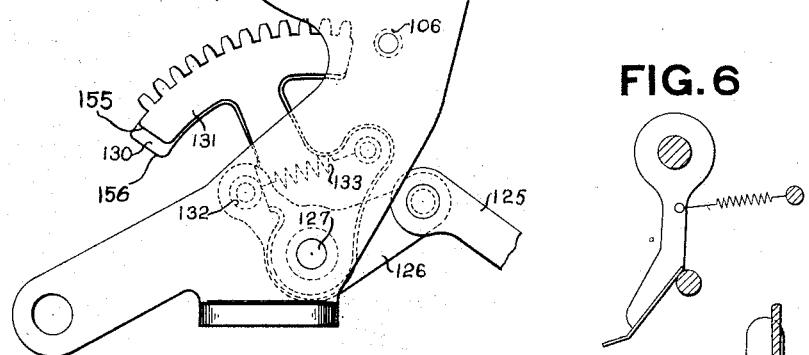
Fig. 6 is a detail view showing the mechanism for driving the main cam shaft of the machine.

A main cam shaft 64 is rotated by the usual well known double-faced rack 65 (Fig. 6). The rack is given an upward and downward movement upon depression of any key through a key coupler 66 and a roller 67, in the usual well known manner. A detailed description of this mechanism can be had by referring to the above mentioned Von Pein patents.

*Ribbon mechanism*

An inking ribbon is fed between the type wheels and the impression hammers by a feeding mchanism of the reversible type. This mechanism is best shown in Figs. 8, 9 and 10. Secured to the key coupler 66 (Fig. 14) is an angular bracket 70. A link 71 is pivotally mounted on the bracket 70 at its lower end and is bifurcated at its upper end (Fig. 10) to surround the shaft 38. Also near the upper end of the link 71 is a notch 73 engaging a stud 74 on a two-armed reversing lever 75 loosely mounted on a stud 76 secured to a frame 80, (Figs. 1 and 8), carried on the bail 41. One of the arms of the reversing lever 75 has two notches 81, one of which is engaged by a spring-pressed pawl 82 pivoted on a stud 83 secured to an arm 84 pivoted on the stud 76. The stud 83 enters a slot in a ribbon feeding slide 90 mounted on two studs 91 secured to the frame 80. The slide 90 is formed at each end so as to cooperate with the feeding ratchets 92 on each of two ribbon spools 93 loosely mounted on studs secured to the frame 80. The slots in the slide 90 which surround the studs 91 are slightly wider than the studs, so as to permit enough play when the ends of the slide follow around the periphery of the feeding ratchets. The left hand end of the slide is shown held in engagement with the ratchet by a spring 94. During every operation of the machine the key coupler 66 is given an up-and-down movement, and will, through the link 71, reversing lever 75, pawl 82 and arm 84, move the ribbon feeding slide 90 first to the right and then to the left to feed the ribbon one space. However, when the end of the ribbon is reached, which is secured to the ribbon spool, the arm 84 and feeding slide 90 will be stopped as they move toward the left, and therefore, the reversing lever 75 during its return movement will be rocked counter-clockwise independently of the arm 84 and pawl 82, (Figs. 8 and 9) far enough to cam the pawl 82 out of one notch 81 and into the other notch 81. When the key coupler 66 is rocked counter-clockwise, during the subsequent operation, the reversing lever 75 shifts the feeding slide 90 to the right far enough to engage the ratchet 92 of the right hand ribbon spool (Fig. 8). The ribbon will then be wound on this spool until the other end is reached, at which time the arm 84 will again be stopped as the arm 84 and feeding slide 90 are moving to the right, and the reversing lever 75 will rock clockwise independently of the arm 84, and the pawl 82 will again assume the position shown in Figs. 8 and 9. A guard 95 (Fig. 1), supported by brackets 96 and 97, is provided to prevent the ribbon from smudging the paper. The bracket 97 is carried by a cross bar 98 supported by the side frames 32 of the machine. The bracket 96 is supported by a stud 99 mounted on the bracket 97 near its front end, and by a tie bar 100 near its rear end.

*Item printing mechanism*

The means for making the impression of the values of the items on the record strip is as follows: Secured to the cam shaft 64 is a cam 101 (Fig. 12) adapted to engage an arm 102 (Figs. 12 and 13) pivoted on a stud 103, mounted in a brace 104 (see Fig. 1), supported by the cross bar 98 and the back frame of the machine. The arm 102 has an upwardly extending arm 105 held against a stud 106 mounted in the bracket 97, by a spring 107. The arm 105 has a laterally projecting flange 108 to which is secured a laterally projecting flange 109 of an arm 111. The reason for this construction is to give a better bearing for the arm 102 and to prevent it being twisted laterally by the spring 107. An arm 112 (Figs. 12 and 13) pinned to a shaft 113 is held against a stud 110 in the arm 105 by a spring 115 (Fig. 13). A printing hammer 114 (Figs. 1, 2 and 12) is also secured to the shaft 113. When the shaft 64 rotates the cam 101 counter-clockwise, as shown by the arrow in Fig. 12, the high portion thereon will rock the arms 102 and 105 against the tension of the spring 107 and the arm 112 will follow the stud 110, due to the action of the spring 115 (Fig. 13). This will raise the printing hammer 114. When the arm 102 drops off the high part of the cam 101 the arm 105 will be rocked counter-clockwise by the spring 107. The stud 110, rocks the arm 112 until the arm 105 is stopped by the stud 106 but the momentum gained by the arm 112 and the hammer 114 is sufficient to overcome the resistance of the spring 115 and carries the paper and ribbon against the type with a hammer like blow and thereby makes an impression on the paper.

The timing of the cam 101 is such that the impression will be made after the actuator frame 34 has completed its downward movement and has set the type wheel to the position corresponding to the key depressed.

*Writing opening*

An opening 116, (Fig. 1) is provided in the cabinet so that any notes or information may be written on the record strip to the left of the position where the printed record is subsequently made. This opening is located some distance from the printing hammers for the convenience of the operator. However the line on which the notes are made is shifted to the printing hammers by mechanism to be later described, before the impression is made. A writing table 117 is provided beneath the paper and has two downwardly projecting flanges mounted on the shaft 99. The notations must be made before the machine is operated because the printed record is shifted beneath a glass 120 at the end of the operation.

*Paper shifting and feeding mechanism*

The mechanism for shifting the paper to position the portion adjacent the writing opening to the printing hammer and back beneath the glass will now be described. In paper shifting mechanisms of this type the paper is usually kept taut and, therefore, considerable force is required to shift the paper. This condition is undesirable in machines of the present type, because all of the mechanism in the machine is operated when the keys are depressed. It is very desirable to have a minimum load on the keys, and therefore, the paper is normally in a slack or loose condition, so that it will require very little force to shift it. However, just before the printing takes place it is stretched taut to prevent smearing the print.

Pivoted to the bracket 70 (Fig. 14) is a link 125 which is also pivoted to a bell crank 126, loose on a stud 127 mounted on the bracket 97 (Figs. 1 and 14). Also loosely mounted on the stud 127 are two segments 130 and 131 (Fig. 16) held against a stud 132, on the bell crank 126, by springs 133, one for each of the segments 130 and 131. The segment 130 meshes with a segment 134 secured to the side of a rocker arm 135. The segment 131 meshes with a segment 136 secured to the side of a rocker arm 137. The rocker arms 135 and 137 carry studs 139 and 140, respectively, which have sleeves loosely mounted thereon.

The paper is fed from a supply roll 141 (Figs. 1 and 14) over a circular guide plate 142, having an ear secured to a stud 143. It is then wound around the sleeve on the stud 139, back over the paper on the circular guide plate 142, over two sleeves 144 carried on studs mounted in the bracket 97, over the ribbon guard 95, around a sleeve on the stud 140 mounted on the rocker arm 137, around a sleeve on the stud 143, and then to a receiving roll 146.

When the key coupler is raised upon depression of a key 30, the bell crank 126 is rocked counter-clockwise and the segments 130 and 131 move in the same direction (Figs. 14 and 16) under the influence of the springs 133, and thereby rock the arms 135 and 137 clockwise. Clockwise movement of the stud 139 will loosen the paper while the stud 140, traveling in the same direction, will take it up and shift that portion of the paper adjacent the writing opening to a position adjacent the type wheels 37.

The movement of the segments 130 and 131 is limited by a stud 150 (Fig. 14), mounted on an arm 151 under the control of the total key. The total key and its mechanism will be described when considering the total printing mechanism. It will be sufficient to state here that the stud 150 will assume a different position when printing totals from that when printing items, because the paper must be shifted a greater distance when printing totals than when printing items.

As before mentioned the paper is normally in a loose condition to allow for easy operation. The method of taking out this slack for printing will now be described. It will be noted that the segment 131 and its rocker arm 137 will move slightly farther than the segment 130 and its rocker arm 135, because the edge 156 of the segment 130 will engage the stud 150 and will stop before the edge 155 of the segment 131 engages the stud 150. This extra movement of the rocker arm 137 is sufficient to take up the slack that is normally in the paper and to pull enough paper off the supply roll 141 to space the paper for subsequent printing.

When the key coupler 66 returns to its normal position the stud 132 will drive the segments 130 and 131 back to their normal positions and thereby shift the paper to position the last impression under the glass. During this return movement of the segment 131 the paper which was pulled off the supply roll will be fed on to the receiving roll 141 by mechanism to be hereinafter described. The segment 131 will be driven a short distance before the segment 130 is driven, thereby loosening the paper to provide for easy shifting for the return of the paper, and the paper remains in this loosened condition when the shifting mechanism comes to rest.

The mechanism for feeding the paper which was pulled off the supply roll 141 on to the receiving roll 146 will now be described. A feeding lever 160 (Fig. 15) has secured to one arm thereof a stud 161 resting against a shoulder 162 on the rocker arm 137 (Figs. 15 and 16). Pivoted to the lever 160 is an arm 163 carrying a stud 164. A coil spring 165 wound around a shaft 166 has one end secured to the frame 128, and the other end engages the stud 164. The spring 165 will keep the stud 161 in engagement with the shoulder 162 of the rocker arm 137, and when the segment 131 rocks the arm 137 clockwise as before mentioned, the feeding lever 160 will follow, due to the action of spring 165, until a stud 167 on the arm 163 engages an edge 168 on the frame 128. This will stop the feeding lever 160 but the arm 137 is permitted to go on. Loosely mounted on a stud 170 secured to the other arm of the feeding lever 160 is a roller 171. When the lever 160 is rotated clockwise the roller 171 will move in a space between a flange 172 (Fig. 14) on the receiving roll 146 and an eccentric arm 173 secured to the feeding lever 160. Upon counter-clockwise movement of the rocker arm 137 the shoulder 162 will engage the stud 161 and rock the lever 160 counter-clockwise, and the roller 171 will be wedged between the eccentric arm 173 and the flange 172, thus turning the receiving roll 146 far enough to feed the paper, which was pulled off of the supply roll 141, thereon.

Figure 3:
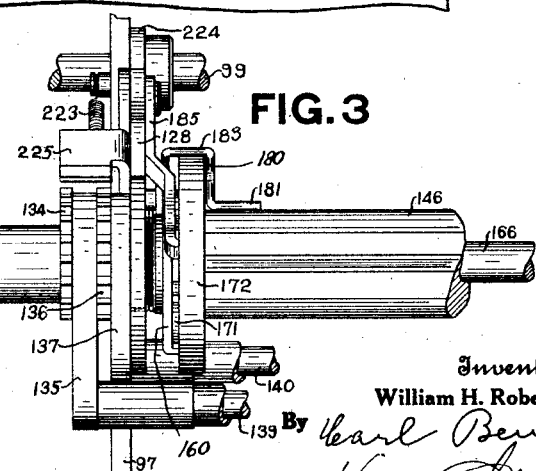
Fig. 3 is an enlarged front elevation of the paper shifting and feeding mechanism.

Means is provided to keep the feed of the paper on to the receiving roll uniform. It will be necessary to vary the angular movement of the receiving roll as the diameter of the roll increases. In order to control this feeding, the following mechanism is provided. Secured to a flange 179 (Fig. 15) on the arm 163 is a rod 180 (Figs. 3, 14 and 15) bent over the flange 172 and having its end 181 (Fig. 3) resting on the paper on the receiving roll. The end 182 (Fig. 15) of the rod 180 projects thru a hole in the arm 163. It can be seen that as the paper on the receiving roll increases in diameter, the end 181 of the rod 180 will be moved away from the center of the receiving roll 146, and the arm 163 will be rocked about its pivot 169 on the feeding lever 160, and thereby move the pin 167 a greater distance from the center of the receiving roll 146. The edge 168 of the frame 128 is formed or developed so that the movement of the pin 167 and the feeding lever 160 will vary in proportion to the diameter of the paper on the receiving roll to control the spacing of the printing on the record. The irregular form of rod 180 provides clearance for the supply roll 141 when the arm 163 swings on its pivot, caused by the increasing diameter of the receiving roller 146.

Means is provided to prevent retrograde movement of the receiving roll when the feeding lever 160 is moved clockwise. Pivoted to the frame 128 is a retaining arm 185 (Fig. 14) having a flange 186. Loosely mounted on a stud 187 is a spring pressed roller 188. Upon clockwise movement of the feeding lever 160 the roller 188 will be wedged between the flanges 172 and 186 by a spring plunger 189. This will prevent retrograde movement of the receiving roll 146 as the feeding lever 160 and its feeding roller 171 are being set preparatory to feeding the paper.

Total printing

At the end of a given period it is desired to print a total of the amount added in the totalizer. The totalizer used in the present machine is of the type shown and described in the above mentioned Carney patent. The only difference is that instead of being a reading totalizer, the present totalizer has type wheels from which a printed record can be made. It is provided with the usual engaging lever 190 (Fig. 1), which is operated by a cam 191, and engages a stud 193 in the side of totalizer frame 194. Mounted in the frame 194 is a shaft 195 upon which are mounted various totalizer actuating pinions 196. Secured to each of the pinions 196 is pinion 197 meshing with the type wheels 198. The type wheels 198 are held in alignment by an aligning disk 199 and a flat spring 200. Upon counter-clockwise rotation of the shaft 64, through the lever 190 and the stud 193, the totalizer frame is rocked about its pivot 201 far enough to engage the pinions 196 with the totalizer actuating segment 35. This engagement takes place before the totalizer actuating segment 35 begins its downward movement. The totalizer frame is again disengaged before the segment 35 returns to its normal position. It can therefore be seen that upon depression of an amount key, an amount equal to the value of the key depressed will be added into the totalizer.

The usual transfer mechanism commonly employed in this type of totalizer is used herein. A detailed description can be had by referring to the above mentioned Carney and Von Pein patents.

Figure 2:
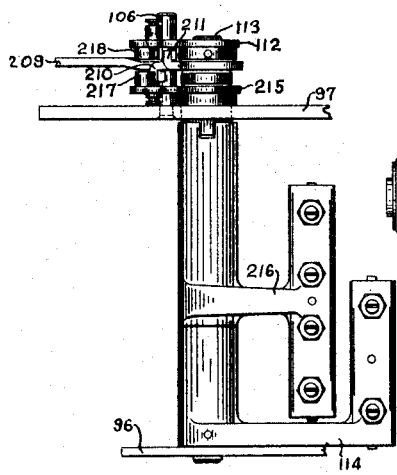
Fig. 2 is a detail plan view of the item and total printing hammers.

An independent hammer is provided for printing totals and is under control of a total key 205 (Fig. 14). The key 205 has a roller 206 entered into a cam slot 207 (Figs. 12 and 14) in an arm 208 secured to the previously mentioned arm 151. Pivoted to the arm 151 is a link 209 (Fig. 12), bifurcated at its upper end and surrounding the shaft 113. The link 209 has two flanges 210 and 211, projecting in opposite directions (Figs. 12 and 13). An arm 215 is loose on the shaft 113 and is clutched to a total-printing hammer 216 (Fig. 2). The arm 215 is held against the stud 110 (Figs. 12 and 13) on the arm 105 by a spring 214. The flange 210 normally engages a stud 217 mounted on the arm 215. Therefore, when printing items, the arm 215 is prevented from rocking counter-clockwise when the cam 101 rocks the arm 105. At this time the flange 211 is above and out of the path of a stud 218 (Fig. 2) mounted on the arm 112 identical with the stud 217. It can therefore be seen that when printing items, the arm 112 is free to rock counter-clockwise and follow the stud 110, as previously described. However, the arm 215 is prevented from rocking because the flange 210 is in the path of the stud 217. The cam slot 207 (Figs. 12 and 14) is so shaped that upon depression of the total key 205 the arm 208 is rocked clockwise, which through the arm 151 will move the link 209 down far enough to remove flange 210 from the path of the stud 217 and bring the flange 211 into the path of the stud 218. The movement of the key 205 operates the coupler 66 and the shaft 64 in the regular way, and the cam 101 operates the arms 102 and 105 as previously described, whereupon the arm 215 is permitted to follow the stud 110 to cock the total printing hammer 216 so that when the arm 102 is released from the cam 101, and the spring 107 functions, the hammer 216 will be operated to take an impression on the record strip from the total type wheels 198 in the same manner as that described for the item-printing hammer 114.

Since the total-printing type wheels are spaced nearer the front of the machine than the item type wheels, it is necessary to shift the paper a greater distance when printing totals than when printing items, so that the printed total will be below the last printed item. It will be remembered that the segments 130 and 131 which shift the paper are rocked until they engage the stud 150 on the arm 151. Upon depression of the total key 205, as just described, the arm 151 is rocked in clockwise direction, which will move the stud 150 farther from the edges 155 and 156 of the segments 130 and 131. It can therefore be seen that when the machine is operated by the total key the segments will be permitted to move a greater distance than when operating it from an amount key, and when they are returned to normal positions, will cause the feeding lever 160 to feed the record strip the required distance.

It will be noticed, by referring to Fig. 11, that the printed total is slightly offset from the printed items. The total printing type wheels 198 are located to make the printed total stand out, and to allow said wheels 198 to move between the item printing type wheels 130

37 to permit the pinions 196 to be rocked into engagement with the totalizer actuating segments 35 when adding.

*Manner of reloading the paper*

Figure 4:
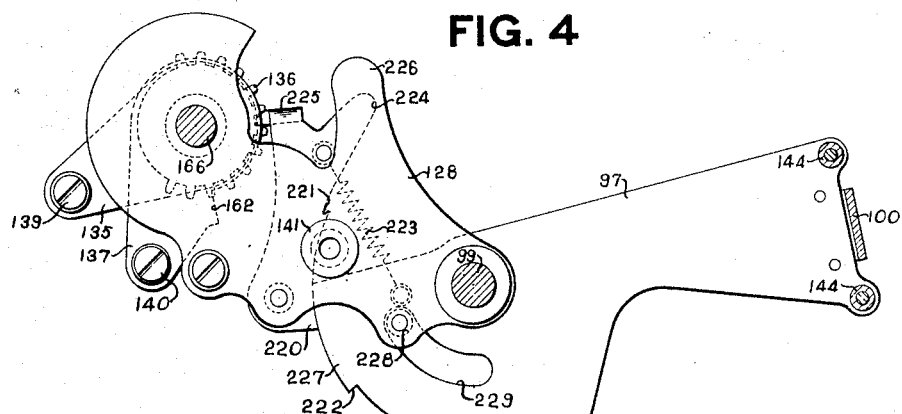
Fig. 4 is an enlarged detail view showing the method of rocking the receiving roll and supply rolls out of the machine to enable the operator to remove the printed record therefrom and to place a new supply of paper in the machine.

In order to provide an easy means for taking the printed record out of the machine and placing a new roll of paper in the machine, the frame 128 carrying the supply roll 141 and receiving roll 146, is pivotally mounted on the stud 99 on the bracket 97 (Fig. 4). The mechanism shown in Fig. 4 is in the position which it assumes when rocked out of the machine. When in the normal position, as shown in Fig. 14, the mechanism is latched to the bracket 97 by a pawl 220. The pawl 220 has a shoulder 221 which engages a shoulder 222 on the bracket 97. The shoulders 221 and 222 are held in engagement with each other by a spring 223. When it is desired to rock the frame 128 about its pivot 99 it is necessary to press on the finger-piece 224 of the pawl 220 to disengage the shoulder 221 from the shoulder 222. The pawl 220 also has a flange 225 which lies adjacent the segments 134 and 136. When the finger-piece 224 is pressed, the flange 225 will engage the teeth of the pinions 134 and 136, and hold them in alignment, while the frame 128 is rocked about its pivot. The frame 128 has a finger-piece 226, to enable the frame to be rocked about its pivot. After the frame has started its rocking movement the edge 227 of the bracket 97 prevents rocking movement of the pawl 220 and the flange 225 is thus held in positive engagement with the segments 134 and 136. A stud 228 mounted in the frame 128 projects through a slot 229 in the bracket 97 and acts as a stop for the frame 128. The frame 128 must be held in this position while the paper is being removed and the new paper is being placed thereon. As the aligning flange 225 of the pawl 220 holds the segments 134 and 136 in proper alignment, when the frame 128 is again returned to its normal position the teeth of the segments will properly mesh with the segments 130 and 131.

*Operation*

The general operation of the machine comprises the following steps: When it is desired to enter an item in the totalizer one of the keys 30 is depressed, which will set the item printing type wheels 37 and also add the amount into the totalizer. During the time that the item is being entered in the totalizer and set up on the item type wheels 37, that portion of the paper adjacent the writing opening is shifted to the printing line. After this is accomplished, the item printing hammer 114 will make an impression on the paper from the item wheels 37, after which the record strip is shifted to move the printed record towards the writing opening. During this return shifting movement the paper receives a feeding movement, so that the printed portion will be under the glass just above the writing opening. Any number of items can be entered and printed on the record strip. When it is desired to print the total of the items the total key 205 is depressed, which automatically selects the total printing hammer 216 and disables the item printing hammer 114, and at the same time shifts the section of the paper to be printed upon, to a position adjacent the total type wheels. After the paper has been properly shifted, the total printing hammer 216 makes an impression and then the paper is shifted back and spaced the same as for item printing.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of printing elements for printing upon record material, a casing having a writing opening spaced from the printing elements, means for shifting the record material forwardly from a position adjacent the writing opening to a position adjacent the printing elements, and for shifting the record material reversely toward the writing opening, means for making an impression on the record material, and means for simultaneously feeding the record material in the forward direction when shifting the record material reversely.

2. In a machine of the class described, the combination of printing elements for printing upon record material, a casing having a writing opening, means for shifting the record material to move that portion adjacent the writing opening in a direction towards the printing elements and back towards the writing opening, and feeding means for feeding the record material in a direction opposite to the last mentioned shifting movement and simultaneously therewith.

3. In a machine of the class described, the combination of printing elements for printing upon record material, a casing having a writing opening, means for shifting the record material from a position adjacent the writing opening to a position adjacent the printing elements and for shifting the record material in a direction towards the writing opening, printing means for making an impression on the record material, and feeding means to feed the record material in a direction opposite to the last mentioned shifting movement, said feeding means being operative before the said last mentioned movement is completed, thereby preventing the printed record from being shifted back to the writing opening.

4. In a machine of the class described, the combination of record material normally in a slack condition, a rocker arm supporting the record material at one point, another rocker arm supporting the record material at another point, means for rocking both rocker arms simultaneously to shift the record material, and means for arresting the first mentioned rocker arm before the second mentioned rocker arm is arrested, to render the record material taut at the end of the shifting movement.

5. In a machine of the class described, the combination of record material normally in a slack condition, a rocker arm supporting the record material at one point, another rocker arm supporting the record material at another point, means for rocking both rocker arms simultaneously to shift the record material, and means for arresting the first mentioned rocker arm before the second mentioned rocker arm is arrested, to render the record material taut and to unwind record material from the supply roll at the end of the shifting movement.

6. In a machine of the class described, the combination of record material normally in a slack condition, a rocker arm supporting the record material at one point, another rocker arm supporting the record material at another point, means for rocking both rocker arms simultaneously to shift the record material, means for arresting the first mentioned rocker arm before the second mentioned rocker arm is arrested, to render the record material taut at the end of the shifting movement, and means to feed the record material to prevent the record material from shifting back to the original position.

7. In a machine of the class described, the combination of record material, a casing having a writing opening, a rocker arm supporting the record material at one point, another rocker arm supporting the record material at another point, means for rocking both rocker arms simultaneously to shift the record material from a point adjacent the writing opening to a position to receive an impression, means for arresting the first mentioned rocker arm before the second mentioned rocker arm is arrested, to render the record material taut at the end of the shifting movement, and means to feed the record material for preventing the printed portion of the record material from shifting back to the writing opening.

8. In a machine of the class described, the combination of record material, a casing having a writing opening, a rocker arm supporting the record material at one point, another rocker arm supporting the record material at another point, means for rocking both rocker arms simultaneously to shift the record material from a point adjacent the writing opening to a position to receive an impression, means for arresting the first mentioned rocker arm before the second mentioned rocker is arrested, to render the record material taut at the end of the shifting movement, and means actuated by one of the rocker arms to cause the record material to be fed to prevent the printed portion of the record material from shifting back to the writing opening.

9. In a machine of the class described, the combination of record material, a receiving roll, a rocker arm mounted on the same center as the receiving roll, a sleeve mounted on the rocker arm adapted to give up slack in the record material, another rocker arm mounted on the same center with the receiving roll, and a sleeve mounted on the rocker arm adapted to take up the slack in the record material.

10. In a machine of the class described, the combination of record material, a casing having a writing opening, a plurality of groups of printing elements, means for shifting the record material from a position adjacent the writing opening to a position adjacent one of the printing elements and back again, means for determining to which printing elements the record material will be shifted, and means for flexibly driving the shifting means in one direction and positively in the other direction.

11. In a machine of the class described, the combination of record material, a casing having a writing opening, printing elements, flexible means for shifting the paper from a position opposite the writing opening to a position opposite the printing elements, and positive means for shifting the paper from a position opposite the printing elements to a position adjacent the writing opening.

12. In a machine of the class described, the combination of record material normally in a slack condition, a flexibly driven member supporting the record material, another flexibly driven member supporting the record material, said members being adapted to move simultaneously for shifting the record material, and means for stopping the first mentioned flexibly driven member before the second mentioned flexibly driven member for taking up the slack in the record material.

13. In a machine of the class described, the combination of record material, a receiving roll, means for feeding the record material onto the receiving roll, a stationary member, and a formed edge on said member for controlling the amount of feed.

14. In a machine of the class described, the combination of a supply roll, a receiving roll, a movable frame for supporting said rolls, a pair of arms for feeding the paper from the supply roll to the receiving roll, means for latching the movable frame in the machine, and means coacting with said latching means to prevent movement of the latching means relatively to the frame when the frame is unlatched, thus positively locking said arms.

15. In a machine of the class described, the combination of a swinging frame, a plurality of driven members on said frame, a plurality of driving members, means for locking the swinging frame against movement to hold said driven members engaged with their driving members, and means coacting with the locking means to prevent movement of said locking means when the swinging frame is unlocked, to maintain a positive lock for the driven members.

16. In a machine of the class described, the combination of item printing means, total printing means, record material shifting means to shift the record material to different extents to bring the working line thereon to the item printing means and the total printing means, respectively, and means to control the extent to which the record material shall be shifted.

17. In a machine of the class described, the combination with printing mechanism to print on record material, of a pair of rocking members to shift the writing line on the normally slack record material towards and from the printing mechanism; means to actuate the rocking members in one direction and to return them to normal position; and means to control the rocking members when shifted in one direction, to enable them to tauten the record material prior to the printing operation, the actuating means adapted to control the rocking members subsequently to the printing operation to slacken the record material.

18. In a machine of the class described, the combination of a pair of record material shifting members normally lying at one limit of their respective paths; means to advance the shifting members in unison towards their opposite limits of travel and relatively to each other as they approach said opposite limits of their travel, and to restore the shifting members to their normal positions effecting a relative movement of the shifting members at the beginning of the return movement and subsequently effecting a movement in unison of the shifting members.

19. In a machine of the class described, the combination of a pair of record material shifting members normally lying at one limit of their respective paths; means to simultaneously advance the shifting members, and to restore the shifting members to their normal positions; and means to enable one of the shifting members to obtain a lead over the other when the members are being advanced to enable them to be successively picked up when being restored to their normal home and relative positions.

20. In a machine of the class described having a writing opening, the combination with impression mechanism for printing upon record material which passes beneath the writing opening, the record material web being normally in slackened condition; independently operable rocker arms to support the web of the record material at separated points; means operable to rock the rocker arms simultaneously in one direction to shift that section of the web which lies under the writing opening, to the impression mechanism; means to arrest one of the rocking arms prior to the arrest of the remaining rocking arm, to enable said remaining rocker arm, as it completes its movement in one direction, to tauten the record material preliminary to the operation of the impression mechanism; the operable means adapted to restore the rocking arms to their normal positions to shift the web in the reverse direction; and means operable between the beginning of the shifting movement of the record material in one direction and the completion of its shifting movement in the opposite direction, to line space the record material, and thereby prevent the return of the last entry thereon to a point beneath the writing opening.

21. In a machine of the class described; the combination of a pair of record material supporting members; and means including a pair of segments, springs, and a bell crank for moving the supporting members in one direction a definite distance in unison, then moving one supporting member relatively to the other in the same direction, and for moving said one supporting member in return direction relatively to the other, and finally moving the supporting members in unison to their normal positions.

22. In a machine of the class described; the combination of record material normally in a slackened condition; a pair of rollers to support the record material at certain points; and means including a plurality of driving members, resilient devices and a power member common to the driving members, to operate the driving members through the resilient devices, to move the pair of rollers in unison to shift the record material bodily, then relatively to each other to take up all slack in the record material and draw more material from its source of supply, said power member then directly operating said driving members relatively to each other to again produce slack in the record material, and finally in unison, to shift the record material bodily towards its home position.

23. In a machine of the class described, the combination of a pair of separately mounted rockable arms for shifting record material, one of said arms adapted to receive a greater movement than the other arm to draw the record material from a supply roll during the shifting movement of the record material; and means for winding the amount drawn from the supply roll onto a receiving roll.

24. In a machine of the class described, the combination of a record material supply roll, a record material receiving roll, a pair of separately mounted arms movable in unison for shifting the record material and movable relatively to each other to draw the record material from the supply roll, and means actuated by one of said arms to feed the record material previously drawn from the supply roll onto the receiving roll.

25. In a machine of the class described; the combination of a record material receiving roll; a pair of separately mounted arms to shift the record material, said arms operable like extents at a uniform speed a distance sufficient to shift the record material a given distance; and means to arrest one of the arms after such shift is completed, one of said arms adapted to continue its travel a certain distance to draw sufficient material from the supply roll to space the record material.

26. In a machine of the class described; the combination of a record material receiving roll; a pair of separately mounted arms to shift the record material, said arms operable like extents at a uniform speed a distance sufficient to shift the record material a given distance; means to arrest one of the arms after such shift is completed, the other arm adapted to continue its advance to draw record material from the supply roll; and means cooperating with one of the arms to feed the record material previously drawn from the supply roll onto the receiving roll.

27. In a machine of the class described, the combination of a record material supply roll; a record material receiving roll mounted to rotate on an axis; a pair of arms separately mounted on said axis, said arms adapted to shift record material; and means, also mounted on said axis, to space the record material, said means operated by one of said arms.

28. In a machine of the class described, the combination of a record material supply roll; a record material receiving roll mounted to rotate on an axis; a pair of arms separately mounted on said axis, said arms operable like extents at a uniform speed a distance sufficient to shift the record material; means to arrest one of the arms after such shift is completed, the other arm adapted to continue its advance to draw record material from the supply roll; and means also mounted on said axis to feed the record material previously drawn from the supply roll onto the receiving roll.

In testimony whereof I affix my signature.

WILLIAM H. ROBERTSON.